United States Patent
Amemiya

(10) Patent No.: US 7,862,732 B2
(45) Date of Patent: Jan. 4, 2011

(54) METHOD FOR FORMING MICRO LENSES AND SEMICONDUCTOR DEVICE INCLUDING THE MICRO LENSES

(75) Inventor: Hiroki Amemiya, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 804 days.

(21) Appl. No.: 11/761,880

(22) Filed: Jun. 12, 2007

(65) Prior Publication Data

US 2008/0000872 A1    Jan. 3, 2008

Related U.S. Application Data

(60) Provisional application No. 60/832,134, filed on Jul. 21, 2006.

(30) Foreign Application Priority Data

Jun. 28, 2006    (JP)    ............................. 2006-178502

(51) Int. Cl.
   *B81C 1/00* (2006.01)
(52) U.S. Cl. ................ 216/2; 216/26; 216/49; 216/72
(58) Field of Classification Search .................. None
   See application file for complete search history.

(56) References Cited

U.S. PATENT DOCUMENTS

| | | | |
|---|---|---|---|
| 5,466,926 A * | 11/1995 | Sasano et al. ................ 250/216 |
| 5,691,116 A | 11/1997 | Revelli et al. | |
| 7,303,690 B2 * | 12/2007 | Amemiya et al. ............. 216/63 |
| 2002/0125210 A1 * | 9/2002 | Rabarot et al. ................ 216/26 |
| 2004/0091211 A1 * | 5/2004 | Umebayshi et al. ........... 385/49 |
| 2005/0061772 A1 | 3/2005 | Amemiya | |
| 2005/0264866 A1 * | 12/2005 | Ohtaka et al. ............... 359/290 |
| 2006/0043068 A1 * | 3/2006 | Amemiya et al. ............. 216/67 |
| 2006/0151435 A1 * | 7/2006 | Taniguchi ..................... 216/87 |

FOREIGN PATENT DOCUMENTS

| | | |
|---|---|---|
| KR | 10-2005-0057968 | 6/2005 |
| KR | 10-2007-0032712 | 3/2007 |
| WO | WO 2006/001317 A1 | 1/2006 |

OTHER PUBLICATIONS

U.S. Appl. No. 12/512,524, filed Jul. 30, 2009, Amemiya.

* cited by examiner

*Primary Examiner*—Allan Olsen
(74) *Attorney, Agent, or Firm*—Oblon, Spivak, McClelland, Maier & Neustadt, L.L.P.

(57) ABSTRACT

In a method for forming micro lenses, a lens material layer made of an inorganic material is formed on a substrate, and an intermediate layer made of an organic material is formed on the lens material layer. Then, a mask layer made of an organic material is formed on the intermediate layer, and lens shapes are formed in the mask layer. The lens shapes of the mask layer are transcribed to the intermediate layer by etching the mask layer and the intermediate layer. Thereafter, the lens shapes of the intermediate layer are transcribed to the lens material layer to form micro lenses by etching the intermediate layer and the lens material layer using a processing gas containing $SF_6$ gas and $CHF_3$ gas.

12 Claims, 14 Drawing Sheets

FIG.8

| | MASK LAYER | INTER-MEDIATE LAYER | LENS MATERIAL LAYER (SiN MICRO LENS) ETCHING SELECTIVITY (SiN FILM/INTERMEDIATE LAYER) | | | | | |
|---|---|---|---|---|---|---|---|---|
| | | | 0.95 | 1.42 | 1.59 | 1.66 | 1.75 | |
| PLANE SHAPE | 33 | 32 | 31 | 31 | 31 | 31 | 31 | |
| CROSS SECTIONAL SHAPE | | | | | | | | |
| DISTANCE D1 (d1) | 318nm | 100nm | 384nm | 177nm | 100nm | 0nm | 0nm | |
| ETCHING DEPTH | | | 651nm | 822nm | 733nm | 501nm | 577nm | |

| PROCESSING GAS FLOW RATE RATIO SF6/CHF3(O2) | ETCHING SELECTIVITY (SiN FILM/ INTERMEDIATE LAYER) | LENS MATERIAL LAYER (SiN FILM) | |
|---|---|---|---|
| | | ETCHING RATE | IN-SURFACE UNIFORMITY |
| 60/25/(30) sccm | 0.86 | 328.2nm/min | ± 4.9% |
| 60/50/(25) sccm | 0.95 | 335.3nm/min | ± 3.9% |
| 30/60 sccm | 1.42 | 292.2nm/min | ± 5.8% |
| 28/60 sccm | 1.59 | 295.2nm/min | ± 6.9% |
| 29/60 sccm | 1.66 | 348.2nm/min | ± 2.9% |
| 25/60 sccm | 1.75 | 311.7nm/min | ± 6.4% |
| 20/60 sccm | 2.17 | 322.9nm/min | ± 14.4% |
| 15/60 sccm | 3.25 | 419.8nm/min | ± 16.6% |

FIG. 11

| | MASK LAYER | INTERMEDIATE LAYER | LENS MATERIAL LAYER (SiO₂ MICRO LENS) ETCHING SELECTIVITY (SiO₂ FILM/INTERMEDIATE LAYER) | | |
|---|---|---|---|---|---|
| | | | 1.63 | 1.80 | 2.06 |
| PLANE SHAPE | 33 | 32 | 31 | 31 | 31 |
| CROSS SECTIONAL SHAPE | | | | | |
| DISTANCE D1 (d1) | 308nm | 100nm | 557nm | 404nm | 153nm |

| PROCESSING GAS FLOW RATE RATIO SF$_6$/CHF$_3$ | ETCHING SELECTIVITY (SiO$_2$ FILM/INTER-MEDIATE LAYER) | LENS MATERIAL LAYER (SiO$_2$ FILM) | |
|---|---|---|---|
| | | ETCHING RATE | IN-SURFACE UNIFORMITY |
| 12/ 60 sccm | 1.63 | 186.4nm/min | ± 4.5% |
| 10/ 60 sccm | 1.80 | 187.3nm/min | ± 4.9% |
| 8/ 60 sccm | 2.06 | 211.7nm/min | ± 1.7% |

METHOD FOR FORMING MICRO LENSES AND SEMICONDUCTOR DEVICE INCLUDING THE MICRO LENSES

FIELD OF THE INVENTION

The present invention relates to a technique for forming micro lenses used as on-chip lenses in, e.g., a CCD solid state imaging device, a liquid crystal display and the like.

BACKGROUND OF THE INVENTION

In a CCD solid state imaging device or a MOS-type solid state imaging device, an efficiency of light collection to photosensitive units is increased by forming micro lenses for the purpose of improving sensitivity by increasing the amount of incident light to pixels. In this case, the micro lenses corresponding to the pixels are arranged in, e.g., a matrix pattern. In order to improve the sensitivity of a CCD or a CMOS sensor, it is required to enlarge an area of the micro lenses so that a large amount of light can be collected on a condensing point. To that end, a distance between adjacent micro lenses needs to be reduced. To be specific, there arises a need to reduce or remove a distance D1 between micro lenses 100 arranged lengthwise or transversely as shown in FIG. 16 and a distance D2 between micro lenses 100 positioned diagonally to each other.

Such micro lenses 100 have different high transmission wavelength areas or different condensing areas depending on their materials. Therefore, it is preferable to provide flexibility in choosing an organic material or an inorganic material, e.g., a silicon nitride film, a silicon oxide film or the like as a lens material depending on its usage. In order to form the micro lenses 100, there is used a semiconductor wafer W (hereinafter, referred to as "wafer") in which an underlayer 101 having photosensitive units and a conductive film, a lens material layer 102 and a mask layer 103 formed of a resist film are laminated in that order from the bottom, as depicted in FIG. 17A, for example. As can be seen from FIG. 17A, the mask layer 103 is formed to have lens shapes. By etching the mask layer 103 and the lens material layer 102 by using a plasma of a processing gas, the lens shapes of the mask layer 103 are transcribed to the lens material layer 102, thereby forming the micro lenses 100.

The mask layer 103 that has been formed to have the lens shapes by a photolithographic process is softened by a heat treatment performed after the exposure process. Therefore, if the lenses are positioned close to each other, the lenses that have been softened adhere to each other due to a surface tension, which results in deformed lens shapes. Therefore, the lenses in the mask layer 103 are separated from each other by a distance d1 of, e.g., about 0.2 μm to about 0.5 μm, so as not to adhere to each other, and separated diagonally to each other by a distance d2 of, e.g., about 1 μm. Hence, the micro lenses 100 transcribed to the lens material layer 102 are also separated from each other by the distances corresponding to D1 and D2.

However, when the lens material layer 102 is made of an inorganic material, the distances D1 and D2 between the micro lenses 100 transcribed to the lens material layer 102 become greater than the distances d1 and d2 between the lens shapes in the mask layer (hereinafter, referred to as "initial distances d1 and d2"), as shown in FIGS. 17A and 17B in which the distances D1 and d1 are depicted representatively.

To that end, Japanese Patent Laid-open Application No. 2005-101232 has proposed a technique for reducing a distance between lenses in a method for forming micro lenses by using, e.g., a silicon nitride film. In this technique, a mask layer and a lens material layer formed of an $Si_3N_4$ film are etched by using $SF_6$ gas and $CHF_3$ gas as processing gases, while controlling a flow rate ratio of those gases. Accordingly, deposits are deposited on sidewalls of lenses formed in the mask layer to reduce a distance between the lenses in the mask layer, and the shapes of the lenses are transcribed to the lens material layer, so that a distance between micro lenses of the lens material layer is also reduced.

However, the present inventors have found that the above-described technique is not sufficient to reduce the distances D1 and D2, which hinders the improvement in sensitivity of a solid state imaging device using micro lenses made of an inorganic material. Consequently, it is difficult to obtain sufficient flexibility in choosing a material of micro lenses depending on its usage between an organic material and an inorganic material.

SUMMARY OF THE INVENTION

It is, therefore, an object of the present invention to provide a method for forming micro lenses having a large surface area and a reduced distance between adjacent micro lenses and controlling lens shapes thereof and a semiconductor device having the micro lenses.

In accordance with one aspect of the invention, there is provided a method for forming micro lenses including the steps of: (a) forming a lens material layer made of an inorganic material on a substrate; (b) forming an intermediate layer made of an organic material on the lens material layer; (c) forming a mask layer made of an organic material on the intermediate layer; (d) forming lens shapes in the mask layer; (e) transcribing the lens shapes of the mask layer to the intermediate layer by etching the mask layer and the intermediate layer; and (f) transcribing the lens shapes of the intermediate layer to the lens material layer to form micro lenses by etching the intermediate layer and the lens material layer while using a processing gas containing $SF_6$ gas and $CHF_3$ gas.

The lens material layer is formed of a film selected from a silicon nitride film, a silicon oxide film and a silicon nitride oxide film. In the step (e), a gas containing carbon and fluorine is used as a processing gas. The mask layer may be a resist film or a film made of an organic material same as the organic material of the intermediate layer.

In case the lens material layer is a silicon nitride film, in the step (f), the etching is preferably performed under a condition that an etching selectivity obtained by dividing an etching rate of the lens material layer by an etching rate of the intermediate layer is in a range of about 1.0 to about 1.6. Moreover, it is more preferable to perform the etching under a condition that the etching selectivity is in a range of about 1.4 to about 1.6. Meanwhile, in case the lens material layer is a silicon oxide film, in the step (f), it is preferable to perform the etching under a condition that the etching selectivity is about 1.7 or greater. Further, it is more preferable to perform the etching under a condition that the etching selectivity is about 1.8 or greater. The etching selectivity is controlled by adjusting a flow rate ratio between the $SF_6$ gas and the $CHF_3$ gas.

The micro lenses are light condensing micro lenses arranged to respectively correspond to a plurality of photosensitive units arranged in a matrix pattern in a solid state imaging device. In accordance with another aspect of the invention, there is provided a semiconductor device including micro lenses formed by the above-described method.

In accordance with the present invention, micro lenses having a large surface area can be formed by reducing a distance between adjacent micro lenses and controlling lens shapes thereof, as will be described in following test examples.

BRIEF DESCRIPTION OF THE DRAWINGS

The above and other objects and features of the present invention will become apparent from the following description of embodiments, given in conjunction with the accompanying drawings, in which:

FIG. 8 shows a characteristic diagram illustrating top views and cross sectional views of the micro lenses, distances D1 between adjacent micro lenses and etching depths, which are results of a test example 1-2;

FIG. 11 describes a characteristic diagram presenting top views and cross sectional views of micro lenses and distances D1 between adjacent micro lenses, which are results of a test example 2-1;

DETAILED DESCRIPTION OF THE EMBODIMENT

Figure 1:
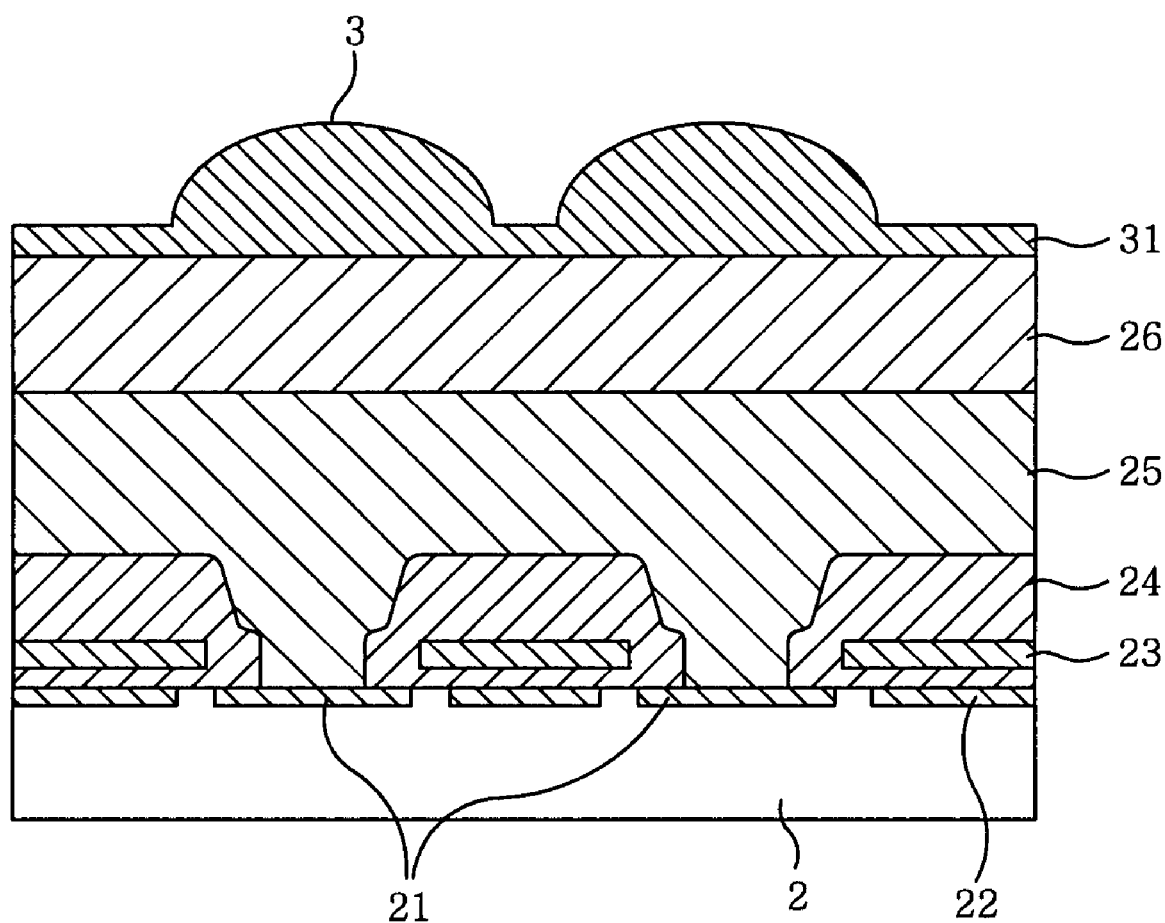
FIG. 1 shows a cross sectional view of an example of a CCD solid state imaging device having micro lenses of the present invention.

Hereinafter, as an example of a semiconductor device in accordance with the present invention, there will be described a CCD solid state imaging device having micro lenses. FIG. 1 shows an exemplary configuration of the CCD solid state imaging device. A semiconductor substrate 2, e.g., a Si substrate, has on its surface photosensitive units 21 arranged in a matrix pattern and vertical registers 22. Rays incident on the photosensitive units 21 are photoelectrically converted by photodiodes and then transmitted to an output unit (not shown) by the vertical registers 22. A conductive film 23 forming a transfer electrode made of, e.g., polysilicon, is formed on the Si substrate 2 at the areas where the photosensitive units 21 are not provided. Further, a shading film 24 made of, e.g., aluminum, is formed on the conductive film 23.

The shading film 24 is designed to suppress the incidence of rays on the conductive film 23 while allowing the photosensitive units 21 to receive the incident rays. Accordingly, openings are formed at the areas of the shading film 24 corresponding to the photosensitive units 21 to thereby pass the incident rays therethrough. Formed on the shading film 24 is a planarization film 25 made of, e.g., a polyimide-based resin or a polystyrene-based resin.

A color filter layer 26 is formed on the planarization film 25 and micro lenses 3 made of an inorganic material are formed on the color filter layer 26 at the areas corresponding to the photosensitive units 21. The micro lenses 3 are designed to collect light to the photosensitive units 21 and have a plane size larger than that of the photosensitive units 21 in order to collect light in a wider area.

Figure 16:
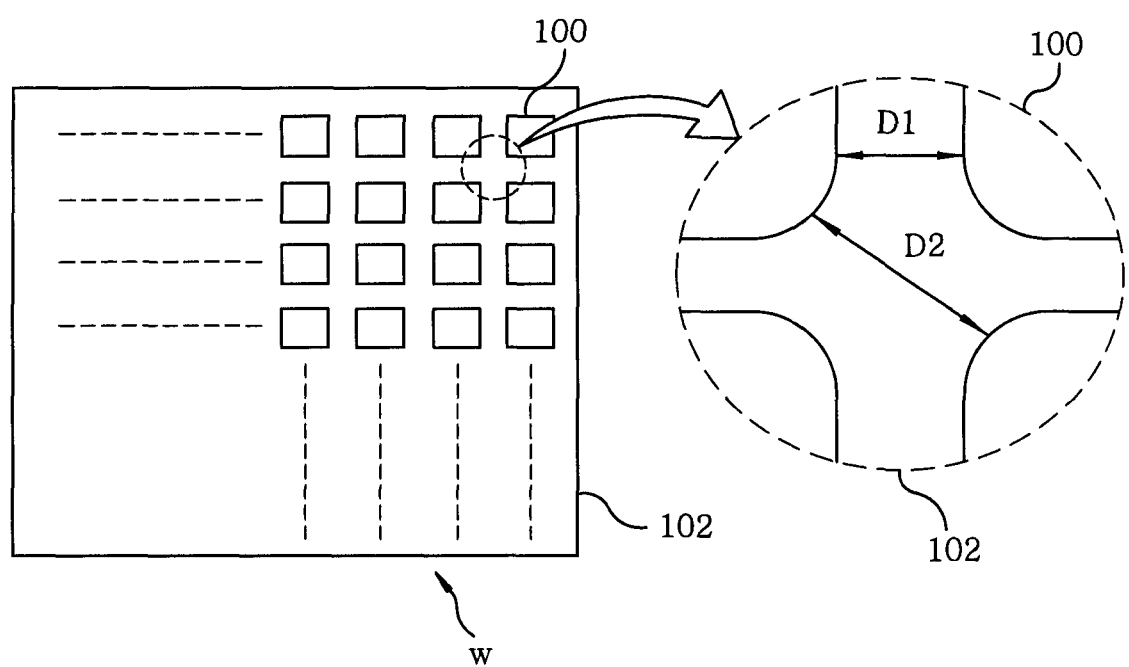
FIG. 16 offers a top view for describing a conventional method for forming micro lenses.
Figure 17A:
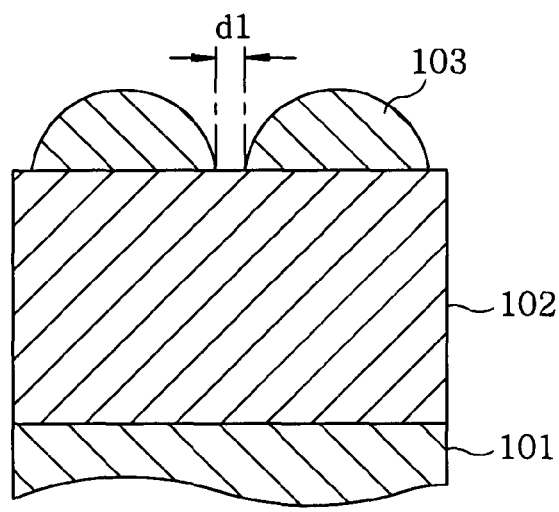
FIGS. 17A and 17B are cross sectional views for depicting the conventional method for forming micro lenses.
Figure 17B:
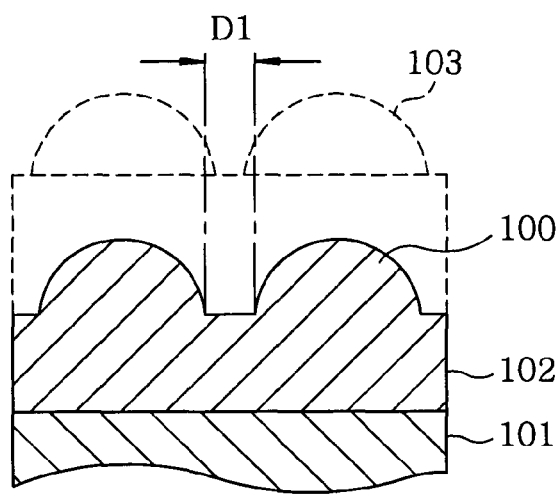

Subsequently, there will be described a method for forming the micro lenses 3 with reference to FIGS. 2 and 3. As described above, the micro lenses 3 are formed in a matrix pattern on a wafer W as the substrate. In this case, the micro lenses 3 adjacent to each other in X and Y directions have a distance D1 therebetween and, also, the micro lenses 3 positioned diagonally to each other have a distance D2 therebetween (see, FIG. 16). The present invention has a purpose of making the distances D1 and D2 less than initial distances d1 and d2 in a mask layer 33 by controlling the lens shapes. Since the distance D2 can be automatically reduced by reducing the distance D1, the reduction of the distance D1 will be explained hereinafter.

First of all, the photosensitive units 21 and the vertical registers 22 are formed on the Si substrate 2 and the conductive film 23 and the shading film 24 are there formed. Next, the planarization film 25 and the color filter layer 26 are formed thereon in that order. Thereafter, a lens material layer 31 made of an inorganic material, e.g., a silicon nitride film, is formed on the color filter layer 26 with a thickness of, e.g., about 1 μm, as illustrated in FIG. 1. Then, an intermediate layer 32 and a mask layer 33 are formed on the lens material layer 31 in that order. The intermediate layer 32 is formed of a film made of an organic material with a thickness of, e.g., about 0.5 μm to about 1.5 μm. Further, the mask layer 33 is formed of a film made of an organic material with a thickness of, e.g., about 0.6 μm.

Herein, the silicon nitride film is a film including Si and N, and a main component thereof is thought to be $Si_3N_4$. Hereinafter, the silicon nitride film is referred to as an SiN film. In an example of a method for forming the SiN film, gases containing Si and N, e.g., $SiCl_2$ gas and $NH_3$ gas are used as source gases. By converting the $SiCl_2$ gas and the $NH_3$ gas into a plasma, active species of Si and N contained in the plasma are deposited on the color filter layer 26, thereby forming the SiN film.

The organic film forming the intermediate layer 32 is an organic film made of, e.g., C, H and O. As the organic film, there can be used, e.g., a phenol-based resist film, an acryl-based resist film, an KrF resist film, a resist film having cycloolefin-maleic anhydride as a platform (COMA resist film) or the like. The intermediate layer 32 is formed on the lens material layer 31 by spin-coating a specific resist liquid.

As the mask layer 33, there can be used a KrF-based resist film, a phenol-based and an acryl-based resist film such as an I-ray resist film and an X-ray resist film, a resist film having cycloolefin-maleic anhydride as a platform (COMA resist film). The mask layer 33 is formed on the intermediate layer 32 by spin-coating a specific resist liquid. Next, the mask layer 33 is patterned by a photolithographic process and is then subjected to a heat treatment to be formed in specific lens shapes as shown in FIG. 1.

Figure 2A:
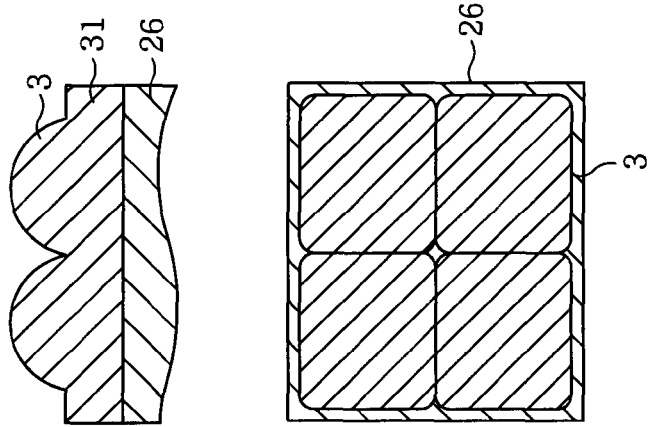
FIGS. 2A to 2C illustrate processes for forming the micro lenses.

Thereafter, as described in FIG. 2A, the mask layer 33 and the intermediate layer 32 are etched by using a first processing gas containing C and F, e.g., $CF_4$ gas and $C_4F_8$ gas, so that the lens shapes of the mask layer 33 are transcribed to the intermediate layer 32. During the etching process, among products of the dissociation of $CF_4$ gas and $C_4F_8$ gas which are obtained by converting those gases into a plasma, F radicals work as an etching species, while CF radicals, $(CF_2)_n$ radicals and the like work as deposition species. It is assumed that the etching proceeds while an etching by the F radicals and a deposition by the CF radicals and the like occur concurrently. At this time, the deposition species are deposited at peripheral areas of the lens shapes of the mask layer 33. Therefore, by selecting a specific etching condition, a width of the lens shape of the mask layer 33 can be increased due to the deposition. By transcribing the lens shape of the mask layer 33 to the intermediate layer 32, a width of the lens shape of the intermediate layer 32 can be increased.

Figure 3A:
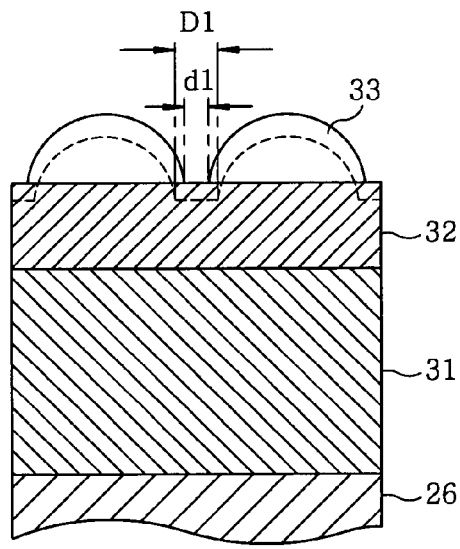
FIGS. 3A to 3C describe processes for forming the micro lenses.

Meanwhile, it has been recognized that, during an initial stage of the etching process, the distance D1 becomes greater than the initial distance d1 due to an unidentified reason, as indicated by a broken line in FIG. 3A. However, since the intermediate layer 32 is made of an organic material containing C, C is generated from the intermediate layer 32 to be included in the deposition species during the etching process. Accordingly, it is believed that the deposition by the CF radicals and the like are facilitated by the C thus generated, so the increased distance D1 is quickly reduced by the deposits to increase an expansion rate of the lens shape as the etching proceeds.

Figure 3B:
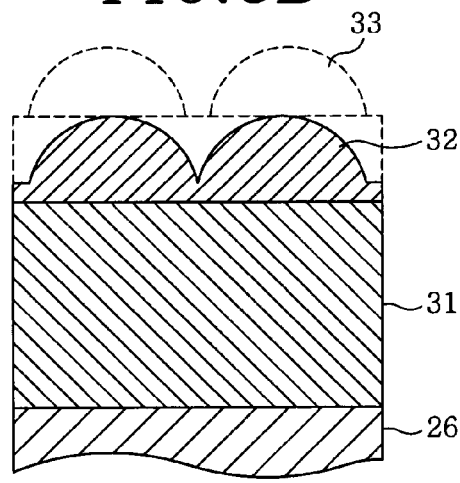

As described above, due to the concurrent performance of the etching and the deposition, the lens shapes of the mask layer 33 are enlarged. Moreover, as the deposition in the distance D1 of the intermediate layer 32 proceeds, the lens shapes of the intermediate layer 32 are enlarged, thereby reducing the distance D1, as shown in FIG. 3B. Further, when an optimal etching condition is selected, bottom portions of the lens shapes of the intermediate layer 32 can contact to each other. As a result, the distance D1 becomes zero and, also, the distance D2 becomes infinitely close to zero.

Figure 2B:
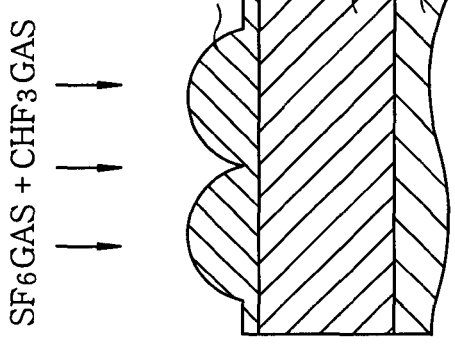

Next, as illustrated in FIG. 2B, the intermediate layer 32 and the lens material layer 31 are etched by using a second processing gas containing $SF_6$ gas and $CHF_3$ gas and, then, the lens shapes of the intermediate layer 32 are transcribed to the lens material layer 31. During the etching process, among products of the dissociation of $SF_4$ gas and $CHF_3$ gas which are obtained by converting those gases into a plasma, F radicals work as etching species, while C radicals, CF radicals, $CF_2$ radicals, $CF_3$ radicals and the like work as deposition species. It is presumed that the etching proceeds while an etching by the F radicals and a deposition by the C radicals and the like occurs concurrently.

In the SiN film forming the lens material layer 31, it is presumed that CF radicals ($CF^*$), $CF_2$ radicals ($CF_2^*$), $CF_3$ radicals ($CF_3^*$) and the like act according to the following reactions. In the following reactions, $SiF_4 \uparrow$ and $N_2 \uparrow$ respectively indicate generation of $SiF_4$ gas and $N_2$ gas and $C \downarrow$ indicates that C works as the deposition species in the lens material layer 31.

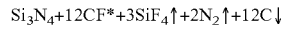

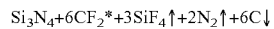

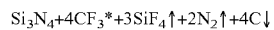

At this time, the deposition species including the C radicals and the like are deposited at peripheral portions of the lens shapes of the intermediate layer 32, so that a width of the lens shape becomes further larger. By transcription of the lens shape of the intermediate layer 32, a width of the lens shape of the lens material layer 31 becomes also larger. Meanwhile, during the initial etching process, the distance D1 of the lens material layer becomes greater than the initial distance d1, as described above. During the etching of the lens material layer 31, $N_2$ gas is generated by the reaction with the C radicals and the like, as depicted in the above reactions. The generation of $N_2$ gas is expected to deteriorate the deposition of the C radicals and the like, and the deposition in the distance D1 is also expected to be hindered compared with the case of etching the intermediate layer 32 formed of an organic film. Consequently, it is presumed that the expansion rate of the lens shape decreases.

Figure 2C:
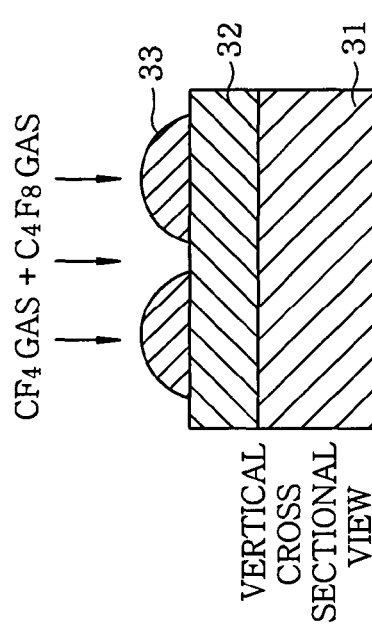
Figure 3C:
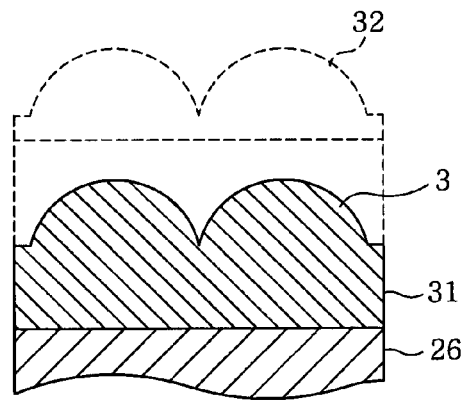

However, as described above, the distance D1 in the intermediate layer 32 has been sufficiently reduced. Further, the deposition species tends to be deposited at the peripheral portions of the lens shapes of the intermediate layer 32 and thus a width of the lens shape of the intermediate layer 32 becomes further larger. Since such lens shapes are transcribed, the lens shapes of the lens material layer 31 also have a reduced distance D1, as shown in FIGS. 2C and 3C. Therefore, by selecting optimal etching conditions, the micro lenses 3 are formed to have the distance D1 of zero and the distance D2 infinitely close to zero therebetween.

Although the cross sectional shapes of the micro lenses 3 are formed in a semicircular shape in FIGS. 2A to 2C and 3A to 3C, they can be formed in a rectangular shape, when viewed from the top, by changing a curvature thereof depending on film types or compositions. Further, the micro lenses 3 are arranged in, e.g., a grid pattern or a honeycomb pattern but the gaps therebetween may be or may not be equal in X and Y directions.

Figure 4:
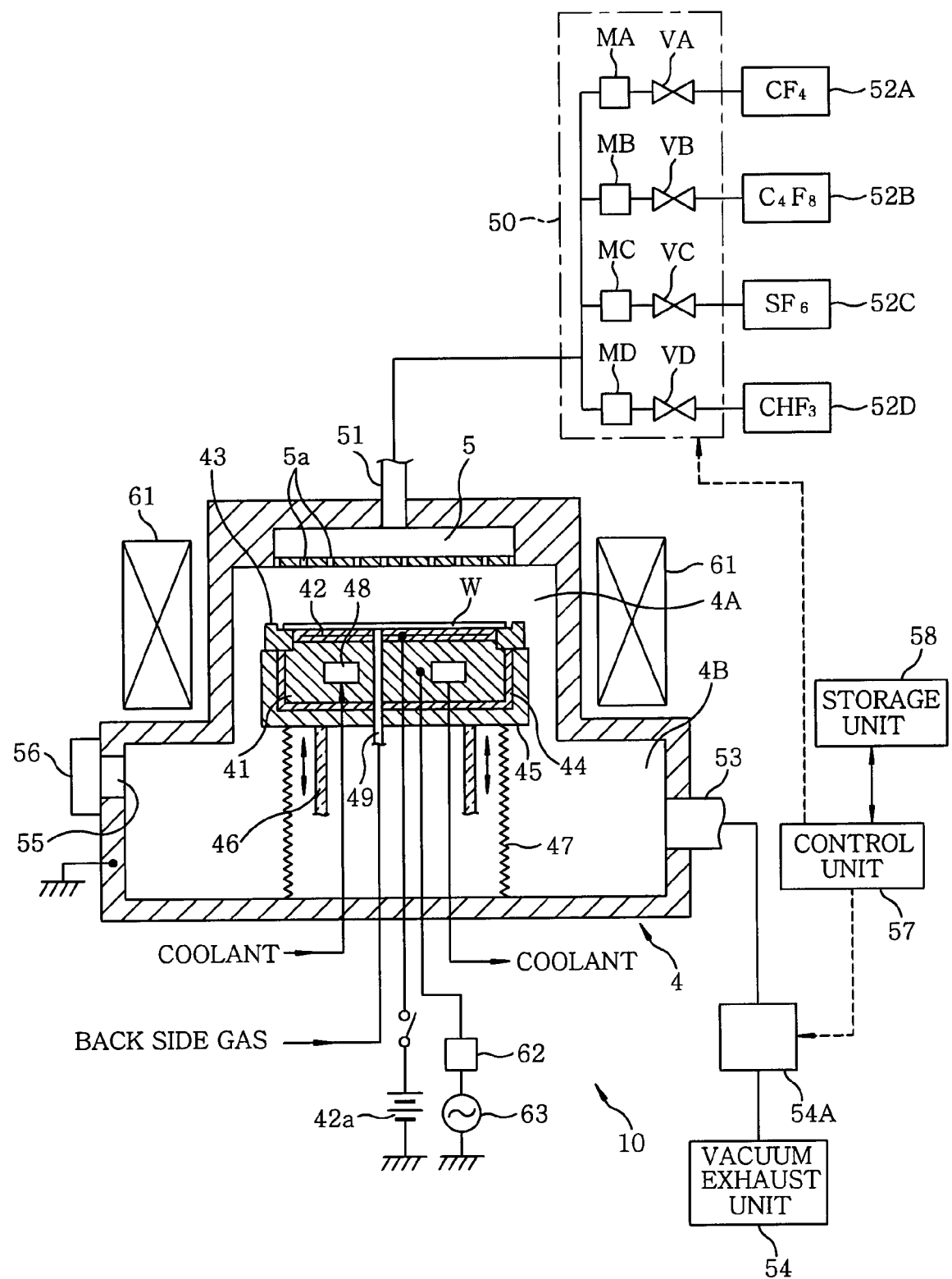
FIG. 4 provides a cross sectional view of an example of a magnetron RIE plasma etching apparatus for performing an etching process for forming the micro lenses.

Hereinafter, a plasma processing apparatus 10 for forming the micro lenses 3 will be described with reference to FIG. 4. An air tightly sealed cylindrical processing chamber 4 having a wall made of, e.g., aluminum, has an upper room 4A and a lower room 4B greater than the upper room 4A. The lower room 4B is grounded.

The processing chamber 4 has therein a mounting table 41 for substantially horizontally supporting a wafer W as a substrate. The mounting table 41 is made of, e.g., aluminum, and serves as a lower electrode. Provided on the top surface of the mounting table 41 is an electrostatic chuck 42 for adsorptively holding the wafer W with an electrostatic adsorptive force. Reference numeral 42a represents a power supply unit for the electrostatic chuck 42. A focus ring 43 is disposed around the wafer W mounted on the top surface of the electrostatic chuck 42. Therefore, when a plasma is generated, the plasma is converged on the wafer W mounted on the mounting table 41 through the focus ring 43. The mounting table 41 is supported by a support 45 made of a conductor via an insulating plate 44 and configured to be vertically moved by an elevating mechanism formed of, e.g., a ball screw mechanism 46, via the support 45 between a mounting position where the top surface of the mounting table 41 is disposed in the lower room 4B and a processing position depicted in FIG. 4. The support 45 is electrically connected with the wall of the processing chamber 4 via a bellows 47 made of, e.g., a stainless steel (SUS).

The mounting table 41 has therein a coolant passage 48 for circulating a coolant. Accordingly, a surface temperature of the mounting table 41 is controlled to, e.g., about 40° C. and, further, the wafer W is controlled to a specific temperature of, e.g., about 60° C., by virtue of the temperature of the mounting table 41 and a heat input from the plasma. Moreover, the mounting table 41 has therein a gas channel 49 designed to supply a backside gas serving as a cooling gas to a space between the electrostatic chuck 42 and the bottom surface of the wafer W to thereby control the temperature of the wafer W.

A gas supply chamber 5 is formed at an area of a ceiling portion of the processing chamber 4 facing the mounting table 41 and also serves as an upper electrode. A plurality of gas injection openings 5a are formed in a bottom surface of the gas supply chamber 5. Further, an upper surface of the gas supply chamber 5 is connected via a gas supply line 51 with first processing gas sources, e.g., a $CF_4$ gas source 52A and a $C_4F_8$ gas source 52B, and second processing gas sources, e.g., an $SF_6$ gas source 52C and a $CHF_3$ gas source 52D. A flow rate control unit 50 includes mass flow controllers MA, MB, MC and MD and valves VA, VB, VC and VD. The first processing gas or the second processing gas is supplied through the gas injection openings 5a toward the mounting table 41, substantially uniformly over the entire mounting surface of the mounting table 41.

Provided around the upper room 4A of the processing chamber 4 is a dipole ring magnet 61 having a plurality of columnar anisotropic segment magnets serving as a magnetic field forming unit. With the presence of the dipole ring magnet 61, a specific magnetic field of, e.g. about 100 G, can be applied to the upper room 4A. Further, the mounting table 41 is connected via a matching unit 62 with a high frequency power supply 63 serving as a unit for supplying a high frequency power for plasma generation. A high frequency power of a specific frequency, e.g., about 13.56 MHz, is supplied from the high frequency power supply 63 to the mounting table 41. Accordingly, the gas supply chamber 5 and the mounting table 41 serve as a pair of electrodes and the processing gas can be converted into a plasma by generating a high frequency between the gas supply chamber 5 and the mounting table 41. Further, an inner space of the processing chamber 4 is exhausted to a specific vacuum level by a vacuum exhaust unit 54 via a pressure control unit 54A and a gas exhaust line 53. Reference numeral 55 indicates a loading/unloading port for the wafer, and reference numeral 56 indicates a gate valve for opening/closing the loading/unloading port 55.

In addition, the plasma processing apparatus 10 includes a controller 57 including, e.g., a computer serving as a control unit. The controller 57 has a data processing unit including a program, a memory and a CPU and the like. The program has an instruction for performing a plasma processing on the wafer W by sending control signals from the controller 57 to each component, such as the flow rate control unit 50, the pressure control unit 54A and the like, of the plasma processing apparatus 10. Further, the memory has a section for recording therein values of processing parameters such as a processing pressure, a processing time, a gas flow rate, a power level and the like. When the CPU executes the instruction of the program, the processing parameters are read out and, then, the control signals corresponding to the parameter values are sent to the respective components of the plasma processing apparatus 10. The program (including a program for inputting or displaying the processing parameters) is stored in a storage unit 58 of a computer storage medium, e.g., a flexible disk, a compact disk, an MO (magneto-optical) disk or the like, and installed in the controller 57.

The following is an explanation of an etching process performed by the plasma processing apparatus 10. First of all, by opening a gate valve 56, the wafer W having on its surface the structure shown in FIG. 1 is loaded into the processing chamber 4 by a wafer transfer unit (not illustrated) via the loading/unloading port to be mounted on the mounting table 41 at the mounting position. Next, the mounting table 41 is elevated to the processing position and, then, the inner space of the processing chamber 4 is exhausted to a specific vacuum level, e.g., about 5.3 Pa (40 mTorr), by the vacuum exhaust unit 54 via the pressure control unit 54A. Thereafter, $CF_4$ gas and $C_4F_8$ gas, as the first processing gas, are introduced from the gas supply chamber 5 at flow rates of, e.g., about 100 sccm and about 30 sccm, respectively.

Meanwhile, a high frequency power of a specific frequency, e.g., about 13.56 MHz, is supplied from the high frequency power supply 63 to the mounting table 41 at a power level of, e.g., about 1400 W. As a consequence, a high frequency electric field is formed between the gas supply chamber 5 serving as the upper electrode and the mounting table 41 serving as the lower electrode. Since a horizontal electric field has been formed in the upper room 4A by the dipole ring magnet 61, an orthogonal electromagnetic field is formed in the processing space where the wafer W exists and thus a magnetron discharge occurs due to an electron drift generated by the orthogonal electromagnetic field. Further, the first processing gas is converted into a plasma due to the magnetron discharge, and the mask layer 33 and the intermediate layer 32 are etched by the plasma, as described above.

Next, the introduction of the first processing gas is stopped and, then, the inner space of the processing chamber 4 is exhausted to a specific vacuum level of, e.g., about 2.65 Pa (20 mTorr) by the vacuum exhaust unit 54 via the pressure control unit 54A. Thereafter, $SF_6$ gas and $CHF_3$ gas, as the second processing gas, are introduced from the gas supply chamber 5 at flow rates of, e.g., about 30 sccm and about 60 sccm, respectively.

Meanwhile, a high frequency power of a specific frequency, e.g., about 13.56 MHz, is supplied from the high frequency power supply 63 to the mounting table 41 at a power level of, e.g., about 400 W. As a consequence, a magnetron discharge occurs in the processing space where the wafer W exists, as described above. Further, the second processing gas is converted into a plasma due to the magnetron discharge, and the intermediate layer 32 and the lens material layer 31 on the wafer W are etched by the plasma, as described above. Thereafter, the wafer W having on its surface the micro lenses 3 is unloaded from the processing chamber 4 to the outside by the wafer transfer unit (not illustrated) via the loading/unloading port 55.

As described above, in the above-described embodiment, by providing the intermediate layer 32 between the mask layer 33 and the lens material layer 31 and etching the intermediate layer 32 made of an organic material under specific conditions using the mask layer 33, the lens shape of the intermediate layer 32 becomes larger. Then, the lens material layer 31 made of an inorganic material is etched by using the intermediate layer 32 as a mask. As a consequence, the lens shapes of the intermediate layer 32, which are greater than the lens shapes of the mask layer 33, are transcribed to the lens material layer 31 and, therefore, it is possible to form the micro lenses 3 having the lens shapes greater than those of the mask layer 33. Accordingly, the distance D1 between the micro lenses 3 can be smaller than the initial distance d1. By selecting appropriate etching conditions, the micro lenses 3 can be formed to have the distance D1 of zero and the distance D2 infinitely close to zero.

In contrast, in a case where the mask layer 33 and the lens material layer 31 formed of an SiN film are laminated with no intermediate layer 32 provided therebetween and the micro lenses 3 are formed by using a processing gas containing $SF_6$ gas and $CHF_3$ gas, the deposition of C radicals and the like are hindered by $N_2$ gas while the SiN film is etched as described above. So that, the film formation property deteriorates compared with the case of etching an organic film. Accordingly, the deposition is difficult to proceed in the distance D1 of the lens material layer 31 which has been increased during an initial stage of the etching process.

It is conceivable that the etching process is performed for an extended period of time to enhance the film formation property and facilitate the deposition in the distance D1. However, the SiN film is not allowed to have a thickness greater than about 1 μm in order to ensure high in-surface uniformity and, accordingly, the etching time cannot be lengthened. Such a limited range of the film thickness hinders the enhancement of the film formation property. Therefore, it is presumed that the distance D1 between the micro lenses 3 is difficult to be made smaller than the initial distance d1 between micro lenses of the mask layer 33.

When the lens material layer 31 is etched, the lens shapes of the micro lenses 3 can be controlled by controlling an etching selectivity of the lens material layer 31 to the intermediate layer 32 ((etching rate of the lens material layer 31)/(etching rate of the intermediate layer 32): hereinafter, referred to as "etching selectivity").

The etching selectivity can be controlled by adjusting a flow rate ratio between $SF_6$ gas and $CHF_3$ gas. While the lens material layer 31 is etched, among products of the dissociation of $SF_6$ gas and $CHF_3$ gas, F radicals work as etching species, while C radicals and the like work as deposition species. By adjusting the amount of F radicals and C radicals, an etching property or a deposition property can be controlled and, further, the etching selectivity can also be controlled.

As will be described in following test examples, when the etching selectivity decreases, the deposition property to the etching property decreases. On the other hand, when the etching selectivity increases, the deposition property to the etching property increases and, thus, the lens shape becomes larger. Further, when the etching selectivity increases excessively, the deposition property to the etching property also increases excessively, which results in a decreased etching rate and an etching stop. Moreover, the etching selectivity affects uniformity of the etching rate in the surface of a wafer. Accordingly, it is required to obtain an appropriate range of the etching selectivity based on the above.

In order to form the micro lenses 3 while controlling lens shapes thereof and enhancing in-surface uniformity of the lens shapes within a processing time period in consideration of a throughput of a production line, it is preferable to perform the etching under the condition of an etching selectivity ranging from about 1.0 to about 1.6. Especially, when the etching selectivity ranges from about 1.4 to about 1.6, it is possible to form the micro lenses 3 to have the distance D1 smaller than or equal to the initial distance d1. Further, by restricting the range of the etching selectivity, it is possible to form the micro lenses 3 to have the distance D1 of zero and the distance D2 infinitely close to zero.

Further, by controlling the amount of high frequency power supplied to the processing chamber 4 or the processing pressure in the processing chamber 4, it is possible to control the lens shape and the dimension of the distance D1, as will be described later. It is believed that this is because the variation in the amount of high frequency power or the processing pressure leads to the variation in the amount of energy supplied to $SF_6$ gas and $CHF_3$ gas and hence the variation in the amount of F radicals, C radicals and the like in products dissociated from $SF_6$ gas and $CHF_3$ gas, so that the amount of F radicals for use in the etching and the amount of C radicals and the like for use in the deposition vary even when the flow rate ratio between $SF_6$ gas and $CHF_3$ gas is unchanged. Accordingly, in order to reduce the distance D1, it is preferable to perform the etching process under the condition that the etching rate of the lens material layer 31 becomes greater than that of the intermediate layer 32. The lens shape can be widely varied by controlling the etching processing parameters such as the etching selectivity, the high frequency power supply amount, the processing pressure and the like. As a result, the micro lenses 3 can be formed to have the distances D1 or D2 of zero or close to zero.

As described above, the micro lenses 3 of the present invention are formed by using a three-layered structure including the mask layer 33 and the intermediate layer 32, both being made of an organic material, and the lens material layer 31 made of an inorganic material. By selecting etching conditions, the lens shape can be controlled and the micro lenses 3 made of an inorganic material can be formed to have a considerably small distance D1 of about 0 μm to about 0.1 μm between the adjacent lenses, wherein a width of the lens shape of the micro lenses 3 is greater than that of the lens shape in the mask layer 33. Such micro lenses 3 increase an efficiency of light collection to the photosensitive units 21, thus ensuring high sensitivity.

As described above, since practical use of the micro lenses 3 made of an inorganic material can be increased, there is increased a flexibility in choosing a material of the micro lenses 3 from an organic material and an inorganic material depending on required wavelength areas. Further, when micro lenses 3 made of different materials are formed in multiple layers of a solid state imaging device, light of a specific wavelength range can be selectively collected by each of the micro lenses 3. Accordingly, it is expected that each of the weak wavelength ranges can be compensated.

As for the first processing gas, there may be used a gaseous mixture of a gas selected from $CF_4$ gas, $SF_6$ gas, $C_2F_6$ gas and $C_3F_8$ gas and a gas selected from $C_4F_8$ gas, $C_5F_8$ gas, $C_4F_6$ gas, $C_2F_6$ gas and $C_3F_8$ gas. Further, as for the second processing gas, there may be used a gaseous mixture of $SF_6$ gas, $CHF_3$ gas and $O_2$ gas.

The intermediate layer 32 and the mask layer 33, both being made of an organic material, may be made of a same kind of film or different kinds of films. When the mask layer 33 and the intermediate layer 32 are made of a same kind of film, they are made of, e.g., a phenol-based resist film, an acryl-based resist film, a KrF resist film, a resist film having cycloolefin-maleic anhydride as a platform (COMA resist film) or the like. In this case, the etching selectivity of the mask layer 33 to the intermediate layer 32 becomes 1:1. As a consequence, the shape of the mask layer 33 is precisely transcribed to the intermediate layer 32, so that the lens shape can be easily controlled.

The intermediate layer 32 can be formed in one or more layers. Further, the multiple intermediate layers 32 may be made of a same kind of organic film or different kinds of organic films. By providing the multiple intermediate layers 32 laminated, the lens shapes of the intermediate layers 32 can be widely varied. Since such lens shapes are transcribed to the lens material layer 31, the lens shapes of the micro lenses 3 can also be widely varied.

As for an inorganic material forming the lens material layer 31, there may be used a silicon oxide film, a silicon nitride oxide film or the like. Herein, there will be described a case where a silicon oxide film is used for the lens material layer 31. The silicon oxide film is a film including Si and O, and generally known as an $SiO_2$ film. Hereinafter, the silicon oxide film is referred to as an $SiO_2$ film. In an exemplary method for forming an $SiO_2$ film, as for source gases, there are used oxygen gas and vapor (gas) of an organic source such as tetraethyl orthosilicate ($Si(OC_2H_5)_4$) or the like. By converting oxygen gas and $Si(OC_2H_5)_4$ gas into a plasma, active species of Si and O contained in the plasma are deposited on the color filter layer 26, thereby forming the $SiO_2$ film with a thickness of, e.g., about 4 μm.

During the etching of the lens material layer 31 formed of the $SiO_2$ film, among products of the dissociation of $SF_6$ gas and $CHF_3$ gas which are obtained by converting those gases into a plasma, F radicals work as an etching species, while C radicals, CF radicals, $CF_2$ radicals, $CF_3$ radicals and the like work as a deposition species, as in the case of etching the lens material layer 31 formed of the SiN film. It is presumed that the etching proceeds while an etching by the F radicals and a deposition by the C radicals and the like occur concurrently.

It is presumed that CF radicals (CF*), $CF_2$ radicals ($CF_2$*), $CF_3$ radicals ($CF_3$*) and the like react with the $SiO_2$ film according to the following reactions.

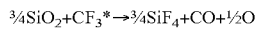

$$\tfrac{3}{4}SiO_2 + CF_3^* \rightarrow \tfrac{3}{4}SiF_4 + CO + \tfrac{1}{2}O$$

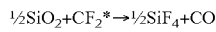

$$\tfrac{1}{2}SiO_2 + CF_2^* \rightarrow \tfrac{1}{2}SiF_4 + CO$$

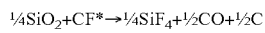

$$\tfrac{1}{4}SiO_2 + CF^* \rightarrow \tfrac{1}{4}SiF_4 + \tfrac{1}{2}CO + \tfrac{1}{2}C$$

During the etching of the $SiO_2$ film, O and CO are generated and, also, C is discharged as deposits. Due to the effects of O or CO, the film formation property is expected to deteriorate compared with the case of etching the intermediate layer 32 formed of an organic film. However, it is presumed that the deposition by the C radicals and the like is less disturbed by C or CO than by $N_2$ gas generated by etching an SiN film. Moreover, since the etching stop caused by an excessively large etching selectivity does not occur, it is expected that lens shape can be increased by increasing the etching selectivity, as will be clearly seen from following test examples.

Therefore, when the lens material layer 31 is an $SiO_2$ film, by performing the etching under the condition that the etching selectivity is about 1.7 or greater, it is possible to form the micro lenses 3 to have lens shapes of required dimensions within the processing time period in consideration of a throughput of a production line. Further, by selecting etching conditions, micro lenses can be formed to have the distance D1 of zero smaller than the initial distance d1 and the distance D2 infinitely close to zero. When the etching is performed with the aforementioned etching selectivity, the in-surface uniformity of the etching rate is acceptable, as will be clearly demonstrated in following test examples.

When the lens material layer 31 is an SiN film or an $SiO_2$ film, it is possible to form the micro lenses 3 to have the distances D1 and D2 of zero or infinitely close to zero by selecting etching conditions. Therefore, it is presumed that the same effects can also be obtained when the micro lenses 3 are formed by using a silicon nitride oxide film. The silicon nitride oxide film is a film containing Si, N and O. Hereinafter, the silicon nitride oxide film is referred to as an SiON film. Such an SiON film is formed by a plasma CVD (chemical vapor deposition) method using a processing gas containing, e.g., Si, N and O.

Figure 5A:
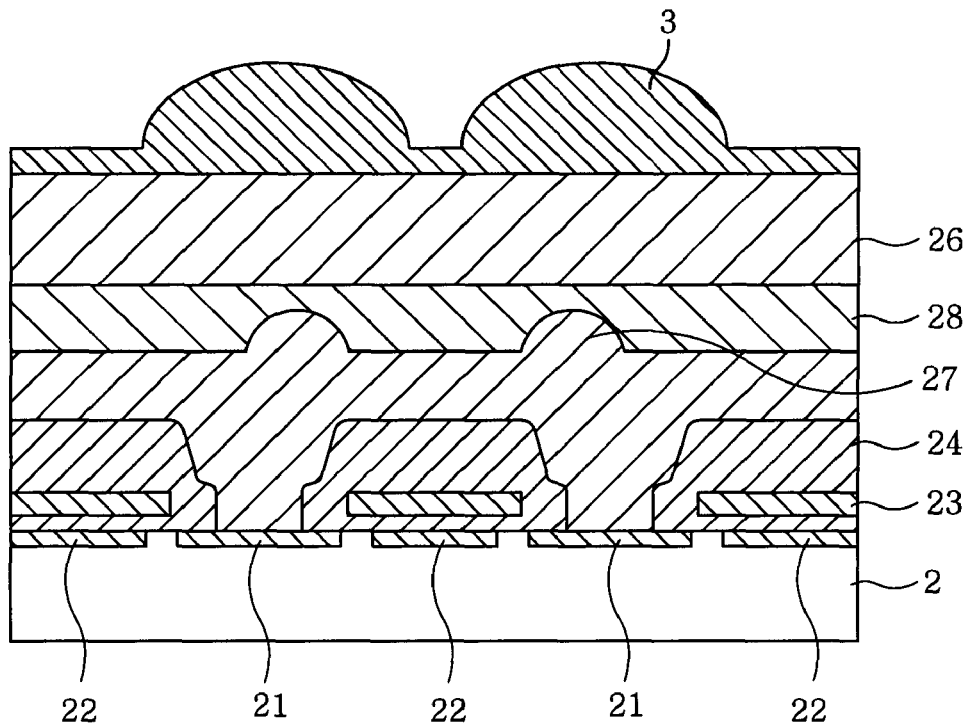
FIGS. 5A and 5B present cross sectional views of another example of the CCD solid state imaging device having the micro lenses of the present invention.
Figure 5B:
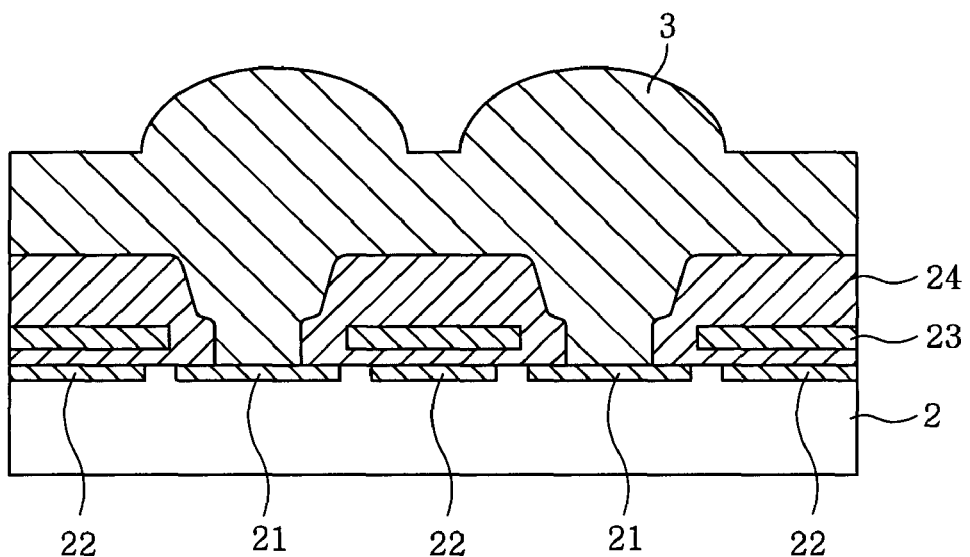

The micro lenses of the present invention can be applied to the micro lenses 3 formed in a CMOS sensor or a CCD solid state imaging device corresponding to a structure shown in FIG. 5A or 5B. FIG. 5A shows an example in which in-layer micro lenses 27 are provided in addition to the micro lenses 3 formed on the surface. In the structure of FIG. 1, the in-layer micro lenses 27 are formed under the color filter layer 26. Further, a planarization film 28 is formed on surfaces of the in-layer micro lenses 27 (there may be provided only the color filter layer 26 on the in-layer micro lenses 27 without forming the planarization film 28). Other parts in the structure of FIG. 5A are the same as those in the structure of FIG. 1. In this structure, the micro lenses 3 on the surface are formed by the method of the present invention. Meanwhile, FIG. 5B provides an example in which the micro lenses 3 are directly formed on an upper area of the shading film 24. The micro lenses 3 on the surface are formed by the method of the present invention.

TEST EXAMPLES

The following is an explanation of test examples that have been implemented to confirm the effects of the present invention. In the following experiments, there was used a wafer W in which the photosensitive units 21, the vertical registers 22, the conductive film 23 and the shading film 24 are sequentially formed on the Si substrate 2 as illustrated in FIG. 1, and the planarization film 25, the color filter layer 26, the lens material layer 31, the intermediate layer 32 and the mask layer 33 having specific lens shapes are formed thereon in that order from the bottom. As for an etching apparatus, there was used the aforementioned plasma etching apparatus depicted in FIG. 4.

1. Lens Material Layer 31 Formed of SiN Film

Test Example 1-1

Figure 6A:
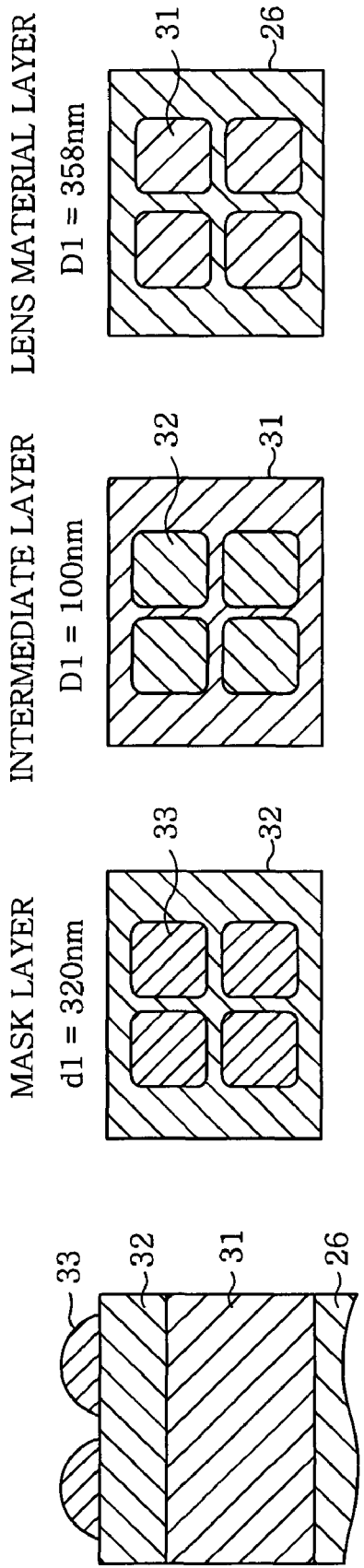
FIGS. 6A and 6B present characteristic diagrams showing top views of the micro lenses and distances D1 between adjacent micro lenses, which are results of a test example 1-1.

An etching was performed under the following conditions on an 8-inch wafer W in which an intermediate layer 32 and a mask layer 33 having specific lens shapes, both being formed of a phenol-based resist film, are formed in that order on a lens material layer 31 having a film thickness of about 1 μm, as illustrated in FIG. 6A. Next, images of the lens shapes of the mask layer 33, the intermediate layer 32 and the lens material layer 31 (micro lenses 3) were captured from the top by using a scanning electron microscope (SEM). Thereafter, the distances D1 in the mask layer 33, the intermediate layer 32 and the lens material layer 31 were measured based on the captured images. FIG. 6A illustrates traces of the images captured by the SEM (hereinafter, referred to as "SEM images") and the distances D1.

(Etching conditions for intermediate layer 32)
Processing gas: $CF_4/C_4F_8$=100/30 sccm
Power of the high frequency power supply: 1400 W
Processing pressure: 5.3 Pa (40 mTorr)
Set temperature of the mounting table: 0° C.
Processing time: The etching was performed for 199 seconds by an EPD (an endpoint detector using a plasma emission spectrum analyzer). Further, an endpoint of the etching was detected based on calculation results from a ratio between an emission spectrum intensity (wavelength 260 nm) of CF radicals and that (wavelength 387.2 nm) of CN radicals, or the like, and the etching was stopped.

(Etching conditions for lens material layer 31)
Processing gas: $SF_6/CHF_3/O_3$=60/50/25 sccm
Etching selectivity: 0.95
Power of the high frequency power supply: 400 W
Processing pressure: 2.65 Pa (20 mTorr)
Set temperature of the mounting table: 0° C.
Processing time: The etching was performed until the lens material layer 31 was etched to a depth of about 750 nm Comparative Example 1

Figure 6B:
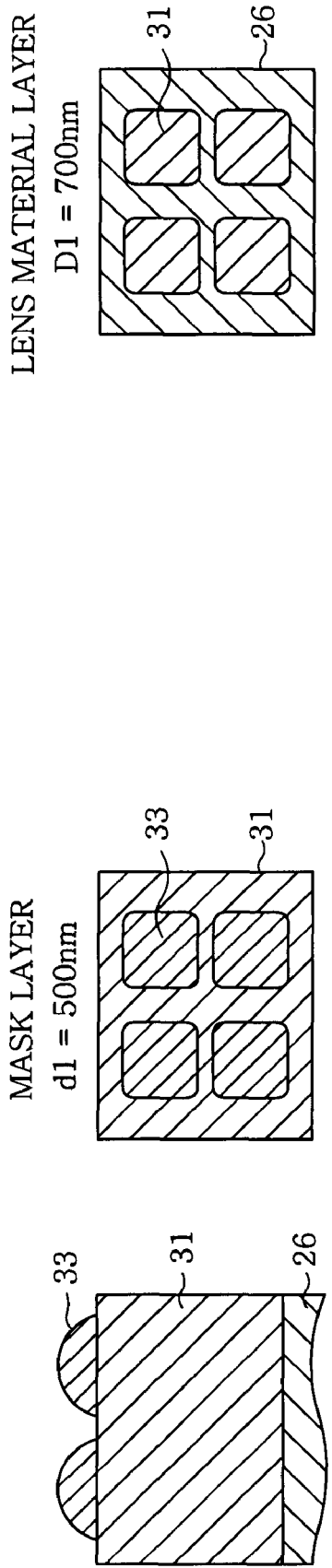

An etching was performed under the following conditions on a wafer W in which a mask layer 33 formed of a phenol-based resist film having specific lens shapes is formed on a lens material layer 31 having a film thickness of about 1 μm, as illustrated in FIG. 6B. Next, SEM images of lens shapes of the mask layer 33 and the lens material layer 31 were captured from the top. Thereafter, the distances D1 in the mask layer 33 and the lens material layer 31 were measured based on the SEM images. FIG. 6B illustrates the trace of the SEM images and the distances D1.
(Etching conditions for lens material layer 31)
Processing gas: $SF_6/CHF_3$=60/60 sccm
Etching selectivity: 1.09
Power of the high frequency power supply: 400 W
Processing pressure: 2.65 Pa (20 mTorr)
Set temperature of the mounting table: 40° C.
Processing time: The etching was performed until the lens material layer 31 was etched to a depth of about 750 nm
(Experimental Results)

In the test example 1-1, the distances D1 (d1) in the mask layer 33, the intermediate layer 32 and the micro lenses 3 were 320 nm, 100 nm and 358 nm, respectively. Meanwhile, in the comparative example 1, the distances D1 (d1) in the mask layer 33 and the micro lenses 3 were 500 nm and 700 nm respectively. Therefore, it has been found that the distance D1 in the micro lenses 3 was about 1.1 times greater than that in the mask layer 33 in the test example 1-1, whereas the distance D1 in the micro lenses 3 was about 1.4 times greater than that in the mask layer 33 in the comparative example 1.

The etching selectivity of about 1.09 in the comparative example 1 is greater than the etching selectivity of about 0.95 in the test example 1-1. The larger etching selectivity enhances the deposition property and thus leads to the increase of the lens shape. However, in the test example 1-1 as well, it is possible to increase the lens shape and further to reduce the distance D1, which verifies the beneficial effects of the present invention. Further, it was found that the distance D1 of the intermediate layer 32 was smaller than the distance d1 of the mask layer 33 in the test example 1-1.

Test Example 1-2

Lens Shape Control by Adjustment of Etching Selectivity

An etching was performed on a wafer W same as that used in the test example 1-1 under the condition in which the etching selectivity of the lens material layer 31 ranges from about 0.95 to about 1.75. Then, top views and cross sectional views of the mask layer 33, the intermediate layer 32 and the lens material layer 31 were captured as SEM images, to thereby monitor variations in the lens shape. Also, the distances D1 (d1) and the etching depths were measured based on the SEM images.

Figure 7A:
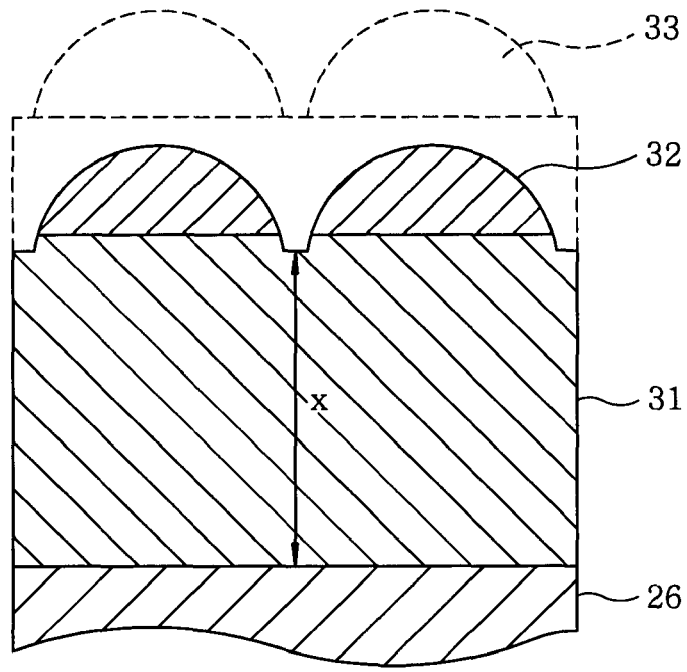
FIGS. 7A and 7B offer cross sectional views for explaining etching depths.
Figure 7B:
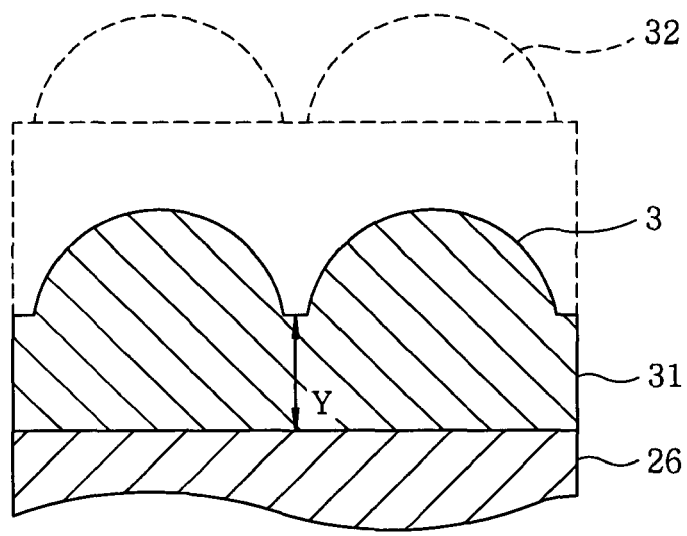
Figures 9, 10:
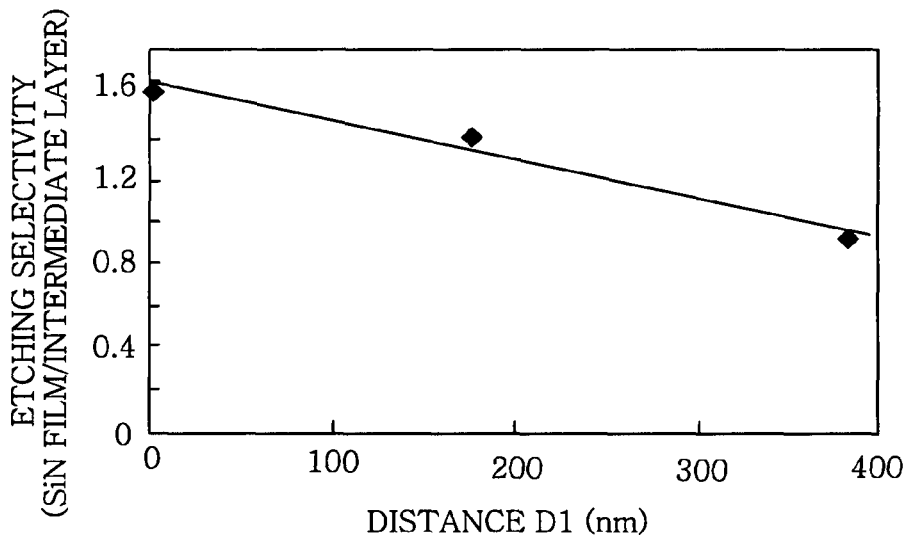
FIG. 9 illustrates a characteristic diagram depicting a relationship between a distance D1 and an etching selectivity, which is a result of the test example 1-2.
FIG. 10 depicts a characteristic diagram describing an etching selectivity, an etching rate and an in-surface uniformity of the etching rate, which are results of test example 1-3.

Herein, the etching depth (etched amount), which is an index of the etched amount of the lens material layer (SiN film) 31, is calculated as a difference (X−Y) between a thickness X of the lens material layer 31 which has been measured after etching the intermediate layer 32 in FIG. 7A and a thickness Y of the etched lens material layer 31 in FIG. 7B. Herein, the thicknesses X and Y indicate thicknesses of areas where the lens shapes are not formed. In this test example, an endpoint of the etching of the intermediate layer 32 is detected by an endpoint detector using a plasma emission spectrum analyzer. When the etching of the intermediate layer 32 is completed, the surface of the lens material layer 31 may be partially etched. FIG. 7A shows a state where the surface of the lens material layer 31 has been etched. Since the distances D1 in the intermediate layer 32 and the lens material layer 31 may not be zero depending on the etching conditions, this example shows a state where a specific distance D1 exists. FIG. 8 shows the trace of the SEM images together with the distances D1 and the etching depths. Further, FIG. 9 illustrates the relationship between the etching selectivity and the distance D1.
(Etching conditions for intermediate layer 32)
The etching was performed under the same conditions as those of the test example 1-1.
(Etching conditions for lens material layer 31)
Processing gas: separate notation
Etching selectivity: separate notation
Power of the high frequency power supply: 400 W
Processing pressure: 2.65 Pa (20 mTorr)
Set temperature of the mounting table: 0° C.
Processing time: The etching was performed until the lens material layer 31 was etched to a depth of about 750 nm The etching selectivity was controlled by varying a flow rate ratio of the processing gas. A relationship between the etching selectivity and the flow rate ratio of the processing gas is described as follows.
Selectivity 0.95: $SF_6/CHF_3/O_2$=60/50/25 sccm
Selectivity 1.42: $SF_6/CHF_3$=30/60 sccm
Selectivity 1.59: $SF_6/CHF_3$=28/60 sccm
Selectivity 1.66: $SF_6/CHF_3$=29/60 sccm
Selectivity 1.75: $SF_6/CHF_3$=25/60 sccm Referring to FIGS. 8 and 9, it has been found that it is possible to change the lens shapes and control the distance D1 by adjusting the etching selectivity. As can be seen from the above results, when the etching selectivity is about 0.95, the distance D1 was greater than the initial distance d1. However, as the etching selectivity was being increased, the distance D1 was reduced. Meanwhile, when the etching selectivity was greater than or equal to about 1.66, the etching was stopped before the etching depth of the lens material layer 31 reaches a target level of about 750 nm. From the above results, when the etching selectivity increases excessively, the etching stops. This is because the deposition by the C radicals and the like exceeds the etching by the F radicals, so that a ratio of the deposition amount to the etched amount increases excessively to cause the etching stop.

Referring also to data of FIG. 9, it has been found that it is preferable to etch the intermediate layer 32 and the lens material layer 31 under the condition in which the etching selectivity ranges from about 1.0 to about 1.6, in order to form the micro lenses 3 to have the distance D1 smaller than the initial distance d1. Especially, it is more preferable to perform the etching under the condition in which the etching selectivity ranges from about 1.4 to about 1.6. In this case, the distance D1 becomes smaller than 150 nm, so that it is possible to form the micro lenses 3 to have the distance D1 substantially equal to or smaller than that of the intermediate layer 32.

Test Example 1-3

Relationship Between Etching Selectivity and In-Surface Uniformity of Etching Rate With respect to a wafer W same as that used in the test example 1-1, the lens material layer 31 was etched under the condition in which the etching selectivity ranges from about 0.86 to about 3.25, and the etching rate of the lens material layer 31 and the in-surface uniformity of the etching rate were measured. The etching rate indicates an average value of etching rates measured at 25 locations in the wafer's surface. Further, the in-surface uniformity of the etching rate is obtained by dividing a deviation of the etching rates measured at 25 locations in the wafer's surface by an absolute value of the etching rate. As the in-surface uniformity of the etching rate goes to zero, the in-surface uniformity of the etching rate is improved. The intermediate layer 32 and the lens material layer 31 were etched under the following conditions.

(Etching conditions for intermediate layer 32)
The etching was performed under the same conditions as those of the test example 1-1.
(Etching conditions for lens material layer 31)
Processing gas: separate notation
Etching selectivity: separate notation
Power of the high frequency power supply: 400 W
Processing pressure: 2.65 Pa (20 mTorr)
Set temperature of the mounting table: 0° C.
Processing time: The etching was performed until the lens material layer 31 was etched to a depth of about 750 nm The etching selectivity was controlled by varying a flow rate ratio of the processing gas. A relationship between the etching selectivity and the flow rate ratio of the processing gas is as follows.

Selectivity 0.86: $SF_6/CHF_3/O_2=60/25/30$ sccm
Selectivity 0.95: $SF_6/CHF_3/O_2=60/50/25$ sccm
Selectivity 1.42: $SF_6/CHF_3=30/60$ sccm
Selectivity 1.59: $SF_6/CHF_3=28/60$ sccm
Selectivity 1.66: $SF_6/CHF_3=29/60$ sccm
Selectivity 1.75: $SF_6/CHF_3=25/60$ sccm
Selectivity 2.17: $SF_6/CHF_3=20/60$ sccm
Selectivity 3.25: $SF_6/CHF_3=15/60$ sccm FIG. 10 shows a relationship between a flow rate ratio and an etching selectivity, an etching rate and in-surface uniformity of the etching rate. As can be seen from the above results, the in-surface uniformity of the etching rate deteriorates abruptly when the etching selectivity is about 1.75 or greater. Accordingly, it has been found that the high in-surface uniformity of the lens shape can be ensured by etching the intermediate layer 32 and the lens material layer 31 under the condition in which the etching selectivity is in a range from about 1.0 to about 1.6.

2. Lens Material Layer 31 Formed of $SiO_2$ Film

Test Example 2-1

Lens Shape Control by Adjustment of Etching Selectivity

Figures 12, 13:
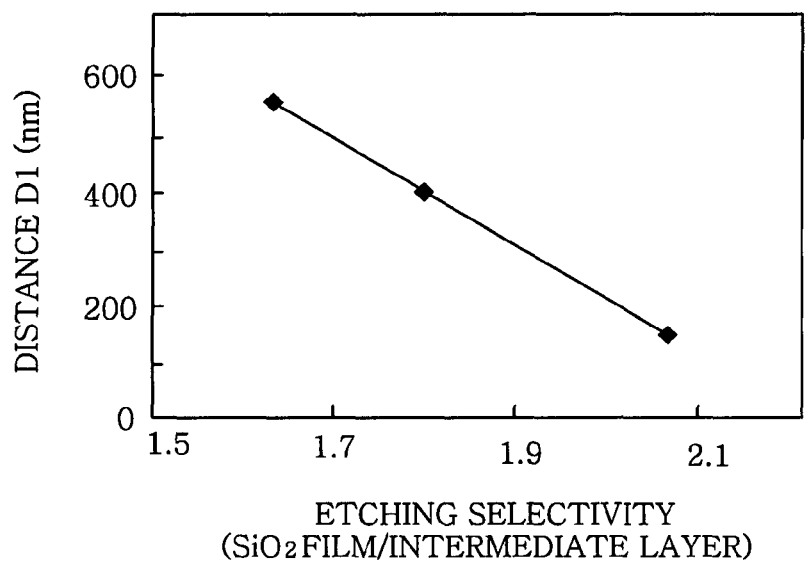
FIG. 12 offers a characteristic diagram representing a relationship between a distance D1 and an etching selectivity, which is a result of the test example 2-1.
FIG. 13 provides a characteristic diagram showing an etching selectivity, an etching rate and an in-surface uniformity of the etching rate, which are results of a test example 2-2.

An etching was performed under the following conditions on a 6-inch wafer W where the intermediate layer 32 and the mask layer 33 having a specific lens shape, both being formed of a phenol-based resist film, are formed in that order from the bottom on the lens material layer 31 having a film thickness of about 4.2 µm. Further, the lens material layer 31 was etched while varying the etching selectivity in a range between about 1.63 and about 2.06. Next, top views and cross sectional views of the mask layer 33, the intermediate layer 32 and the micro lenses 3 were captured as SEM images, to thereby monitor the variation in the lens shape. Then, the distances D1 in the respective layers were measured based on the SEM images. FIG. 11 illustrates the trace of the SEM images together with the distances D1. FIG. 12 depicts the relationship between the etching selectivity and the distance D1.

(Etching conditions for intermediate layer 32)
Processing gas: $CF_4/C_4F_8=100/30$ sccm
Power of the high frequency power supply: 1200 W
Processing pressure: 5.3 Pa (40 mTorr)
Set temperature of the mounting table: 0° C.
Processing time: The etching was performed for 139 seconds by the EPD. Further, an endpoint of the etching was detected based on calculation results from a ratio between an emission spectrum intensity (wavelength 266 nm) of CO radicals and that (wavelength 260) of CF radicals, and the etching was stopped.

(Etching conditions of the lens material layer 31)
Processing gas: separate notation
Etching selectivity: separate notation
Power of the high frequency power supply: 400 W
Processing pressure: 2.65 Pa (20 mTorr)
Set temperature of the mounting table: 0° C.
Processing time: The etching was performed until the lens material layer 31 was etched to a depth of about 2.8 µm The etching selectivity was controlled by varying a flow rate ratio of the processing gas. A relationship between the etching selectivity and the flow rate ratio of the processing gas is as follows.

Selectivity 1.63: $SF_6/CHF_3=12/60$ sccm
Selectivity 1.80: $SF_6/CHF_3=10/60$ sccm
Selectivity 2.06: $SF_6/CHF_3=8/60$ sccm Referring to FIGS. 11 and 12, it has been found that it is possible to change the lens shape and control the distance D1 by adjusting the etching selectivity. As can be seen from the above results, when the etching selectivity is about 1.7 or greater, the distance D1 becomes about 500 nm or less. In case the etching selectivity is about 1.8 or greater, as the etching selectivity increases, the distance D1 is reduced to be substantially equal to the initial distance d1. Moreover, unlike the case where the lens material layer 31 is an SiN film, the etched amount can be ensured even when the etching selectivity increases. That is, when the lens material layer 31 is an $SiO_2$ film, it is presumed that even if the etching selectivity increases, the ratio of the deposition amount to the etched amount does not increase excessively and, therefore, the etching stop is not occurred.

As can be seen from an approximate curve of FIG. 12, it is preferable to etch the intermediate layer 32 and the lens material layer 31 under the condition in which the etching selectivity is about 1.8 or greater, in order to form the micro lenses 3 to have the distance D1 substantially same as or smaller than the initial distance d1. In case the etching is performed under the condition in which the etching selectivity is about 2.2 or greater, the distance D1 is expected to be zero.

Test Example 2-2

Relationship Between Etching Selectivity and In-Surface Uniformity of Etching Rate With respect to a wafer W same as that used in the test example 2-1, the lens material layer 31 was etched under the condition in which the etching selectivity ranges between about 1.63 and about 2.06, and the etching rate of the lens material layer 31 and the in-surface uniformity of the etching rate were measured at nine locations on in the wafer's surface by using the method same as that used in the test example 1-3. The intermediate layer 32 and the lens material layer 31 were etched under the following conditions.

(Etching conditions for intermediate layer 32)
The etching was performed under the conditions same as those of the test example 1-1.
(Etching conditions of the lens material layer 31)
Processing gas: separate notation
Etching selectivity: separate notation
Power of the high frequency power supply: 400 W
Processing pressure: 2.65 Pa (20 mTorr)
Set temperature of the mounting table: 0° C.
Processing time: The etching was performed until the lens material layer 31 was etched to a depth of 2.8 μm The etching selectivity was controlled by varying a flow rate ratio of the processing gas. A relationship between the etching selectivity and the flow rate ratio of the processing gas is the same as that in the test example 2-1.

FIG. 13 shows a relationship between the flow rate ratio and the etching selectivity, the etching rate and in-surface uniformity of the etching rate. Referring to the data shown in FIG. 13, it has been found that when the etching selectivity ranges from about 1.63 to about 2.06, the in-surface uniformity of the etching rate is acceptable.

Test Example 2-3

Relationship Between Distance D1 and High Frequency Power

An etching was performed on the wafer W of the test example 2-1 while fixing the etching selectivity to 1.6 and varying the high frequency power supply amount. Then, the distance D1 between the micro lenses 3 was measured and, also, a relationship of the distance D1 with the high frequency power, the etching rate of the lens material layer 31 and the in-surface uniformity of the etching rate of the lens material 31 were measured. The etching rate and the in-surface uniformity of the etching rate were measured by using the method same as that used in the test example 2-2. The etching was performed under the following conditions.

Figure 14:
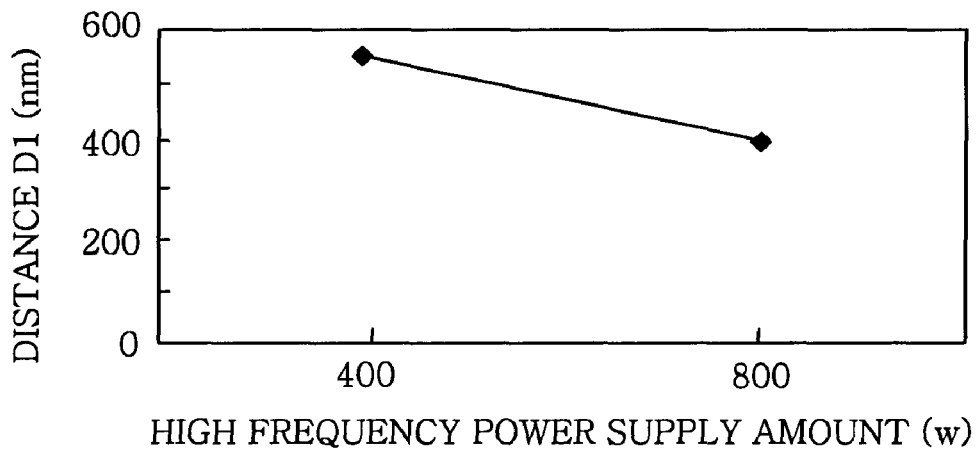
FIG. 14 presents a characteristic diagram illustrating a relationship between a distance D1 and a high frequency power supply amount, which is a result of a test example 2-3.

(Etching conditions for intermediate layer 32)
The etching was performed under the same conditions as those of the test example 1-1.
(Etching conditions for lens material layer 31)
Processing gas: $SF_6/CHF_3$=12/60 sccm
Etching selectivity: 1.6
Power of the high frequency power supply: 400 W, 800 W
Processing pressure: 2.65 Pa (20 mTorr)
Set temperature of the mounting table: 0° C.
Processing time: The etching was performed until the lens material layer 31 was etched to a depth of about 2.8 μm The results are shown in FIG. 14. In FIG. 14, a vertical axis indicates a distance D1, and a horizontal axis represents a high frequency power supply amount. Further, when the power supply amount was about 400 W, the etching rate was about 186.4 nm/min and the in-surface uniformity of the etching rate was about ±4.5%.Meanwhile, when the power supply amount was about 800 W, the etching rate was about 339.6 nm/min and the in-surface uniformity of the etching rate was about ±3.9%. Accordingly, it has been found that by varying the high frequency power supply amount, the lens shape can be controlled and the dimension of the distance D1, the etching rate and the in-surface uniformity of the etching rate can also be controlled. When the etching selectivity was about 1.6, the distance D1 was smaller in case of the power supply amount of about 800 W than in case of the power supply amount of about 400 W, so that the in-surface uniformity of the etching rate was improved in case of the power supply amount of about 800 W.

Test Example 2-4

Relationship Between Distance D1 and Processing Pressure

An etching was performed on the wafer W of the test example 2-1 while fixing the etching selectivity to 1.6 and varying the processing pressure. Then, the distance D1 between the micro lenses 3 was measured and, also, a relationship of the distance D1 with the processing pressure, the etching rate of the lens material layer 31 and the in-surface uniformity of the etching rate of the lens material layer were measured. The etching rate and the in-surface uniformity of the etching rate were measured by using the method same as that used in the test example 2-2. The etching was performed under the following conditions.

Figure 15:
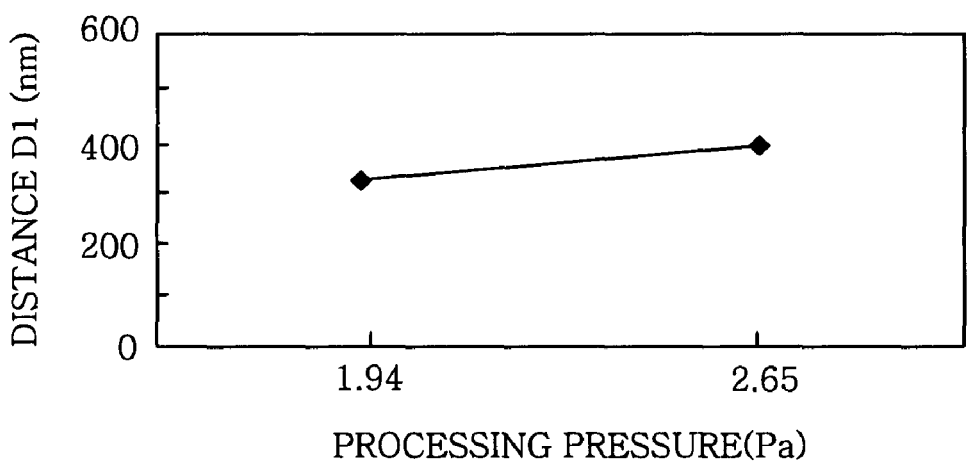
FIG. 15 presents a characteristic diagram showing a relationship between a distance D1 and a processing pressure, which is a result of a test example 2-4.

(Etching conditions for intermediate layer 32)
The etching was performed under the same conditions as those of the test example 1-1.
(Etching conditions for lens material layer 31)
Processing gas: $SF_6/CHF_3$=10/60 sccm
Etching selectivity: 1.6
Power of the high frequency power supply: 800 W
Processing pressure: 1.94 Pa (15 mTorr), 2.65 Pa (20 mTorr)
Set temperature of the mounting table: 0° C.
Processing time: The etching was performed until the lens material layer 31 was etched to a depth of about 2.8 μm The results are illustrated in FIG. 15. In FIG. 15, a vertical axis indicates a distance D1, and a horizontal axis represents a processing pressure. When the processing pressure was about 1.94 Pa, the etching rate was about 339.6 nm/min and the in-surface uniformity of the etching rate was about ±3.9%. Further, when the processing pressure was about 2.65 Pa, the etching rate was about 323.0 nm/min and the in-surface uniformity of the etching rate was about ±4.3%. Accordingly, it has been found that by varying the processing pressure, the lens shape can be controlled and the dimension of the distance D1, the etching rate and the in-surface uniformity of the etching rate can also be controlled. When the etching selectivity was about 1.6, the distance D1 became smaller in case of the processing pressure of about 1.94 Pa, so that the in-surface uniformity of the etching rate was improved.

The lens shape and the in-surface uniformity depend on the high frequency power supply amount and the processing pressure. This is because the increase of the high frequency power supply amount and/or the processing pressure leads to the increase of the amount of F radicals and, hence, the change in the ratio between the amount of F radicals for etching and the amount of C radicals and the like for deposition, which affects the lens shape or the in-surface uniformity of the etching shape. Although the relationship between the distance D1 and the high frequency power supply amount or the processing pressure is not measured in case of the lens material layer 31 formed of an SiN film, it is expected that the same results can be obtained as in the case of the lens material layer 31 formed of an $SiO_2$ film.

The etching process of the present invention can be performed not only by the aforementioned plasma processing apparatus, but also by an apparatus for generating a plasma in a different manner. Moreover, the present invention can be applied to the formation of micro lenses used in a MOS-type solid state imaging device or an LCD as well as micro lenses used in a CCD solid state imaging device. Further, the method of the present invention can be used for forming in-layer lenses as well as micro lenses on an uppermost surface. As a substrate on which the micro lenses of the present invention are formed, a glass substrate other than a semiconductor wafer may be used.

While the invention has been shown and described with respect to the embodiments, it will be understood by those skilled in the art that various changes and modification may be made without departing from the scope of the invention as defined in the following claims.

What is claimed is:

1. A method for forming micro lenses comprising the steps of:
   (a) forming a lens material layer made of an inorganic material on a substrate;
   (b) forming an intermediate layer made of an organic material on the lens material layer;
   (c) forming a mask layer made of an organic material on the intermediate layer;
   (d) forming lens shapes in the mask layer;
   (e) transcribing the lens shapes of the mask layer to the intermediate layer by etching the mask layer and the intermediate layer while using a processing gas containing $CF_4$ and $C_4F_8$ gas; and
   (f) transcribing the lens shapes of the intermediate layer to the lens material layer to form micro lenses by etching the intermediate layer and the lens material layer while using a processing gas containing $SF_6$ gas and $CHF_3$ gas,
   wherein the mask layer and the intermediate layer are separate layers.

2. The method of claim 1, wherein the lens material layer is formed of a film selected from a silicon nitride film, a silicon oxide film and a silicon nitride oxide film.

3. The method of claim 1, wherein the mask layer is a resist film.

4. The method of claim 1, wherein the micro lenses are light condensing micro lenses arranged to respectively correspond to a plurality of photosensitive units arranged in a matrix pattern in a solid state imaging device.

5. The method of claim 1, wherein transcribing the lens shapes of the intermediate layer forms said micro-lenses for a semiconductor device.

6. The method of claim 1, wherein a distance between the lens shapes of the intermediate layer is reduced at a first reduction rate during the etching in the step (e) and a distance between the micro lenses of the lens shape of the lens material layer is reduced at a second reduction rate during the etching in the step (f), and wherein the first reduction rate is greater than the second reduction rate.

7. The method of claim 1, wherein in case the lens material layer is a silicon nitride film, in the step (f), the etching is performed under a condition that an etching selectivity obtained by dividing an etching rate of the lens material layer by an etching rate of the intermediate layer is in a range of about 1.0 to about 1.6.

8. The method of claim 7, wherein in the step (f), the etching is performed under a condition that the etching selectivity is in a range of about 1.4 to about 1.6.

9. The method of claim 7, wherein the etching selectivity is controlled by adjusting a flow rate ratio between the $SF_6$ gas and the $CHF_3$ gas.

10. The method of claim 1, wherein in case the lens material layer is a silicon oxide film, in the step (f), an etching selectivity obtained by dividing an etching rate of the lens material layer by an etching rate of the intermediate layer is about 1.7 or greater.

11. The method of claim 10, wherein in the step (f), the etching is performed under a condition that the etching selectivity is about 1.8 or greater.

12. The method of claim 10, wherein the etching selectivity is controlled by adjusting a flow rate ratio between the $SF_6$ gas and the $CHF_3$ gas.

* * * * *